United States Patent [19]

Granberg et al.

[11] Patent Number: 4,810,964
[45] Date of Patent: Mar. 7, 1989

[54] METHOD AND APPARATUS FOR MEASURING THE DISTANCE BETWEEN A MEASURING TRANSDUCER AND AN OPPOSING SURFACE, PARTICULARLY WITH PAPER PULP EQUIPMENT

[75] Inventors: Bertil Granberg, Karlstad; Bert R. Lanne, Kungalv, both of Sweden

[73] Assignee: Kamyr AB, Karlstad, Sweden

[21] Appl. No.: 821,045

[22] Filed: Jan. 22, 1986

[51] Int. Cl.[4] .............................................. G01B 7/14
[52] U.S. Cl. ...................................... 324/207; 241/37
[58] Field of Search ............... 324/207, 208, 229, 230, 324/234, 239, 243, 226; 241/37

[56] References Cited

U.S. PATENT DOCUMENTS

| 2,531,414 | 11/1950 | Engvall | 324/207 |
|---|---|---|---|
| 2,548,599 | 4/1951 | Garr | 241/37 |
| 3,441,840 | 4/1968 | Randle | 324/230 |
| 4,387,339 | 6/1983 | Akerblom | 324/207 |

FOREIGN PATENT DOCUMENTS 1538415 1/1979 United Kingdom .

Primary Examiner—Reinhard J. Eisenzopf
Assistant Examiner—Walter E. Snow
Attorney, Agent, or Firm—Nixon & Vanderhye

[57] ABSTRACT

A method and apparatus for measuring the spacing between a pair of surfaces, at least one of which is of electrically conductive and/or ferromagnetic material, so that the wear of one of the surfaces can be determined. A measuring transducer having a core with coils, and a reference transducer substantially identical to the measuring transducer, are the basic elements. The measuring transducer is mounted close to an opposing surface of conductive and/or ferromagnetic material with a gap between them, and the reference transducer is mounted with a constant gap spacing between it and a reference surface of the same material as the opposing surface. A current detector, and first and second sources of electrical current, are operatively connected to coils of the transducers so that by sensing the difference in ampere-turns of the coils of respective transducers, or the difference between the magnetic fields produced by coils of the respective transducers, or both, an indication of the distance between the measuring transducer and the opposing surface is provided. The measuring transducer (or a plurality of them) is preferably mounted within a body (such as ferromagnetic material body) having an outer surface so that it is spaced from that outer surface, and wear of that surface can be determined.

17 Claims, 2 Drawing Sheets

METHOD AND APPARATUS FOR MEASURING THE DISTANCE BETWEEN A MEASURING TRANSDUCER AND AN OPPOSING SURFACE, PARTICULARLY WITH PAPER PULP EQUIPMENT

BACKGROUND AND SUMMARY OF THE INVENTION

The invention relates to a method and apparatus for measuring the spacing between a pair of surfaces, at least one of which is of electrically conductive and/or ferromagnetic material. The invention contemplates utilization of magnetic fields for making distance determinations, and is particularly adaptable for situations where one surface wears with respect to another during use.

The primary applicability of the invention is to machinery in which it is important that a particular clearance be maintained between two metallic surfaces that are moving relative to each other. For instance, in conical plug valves or feeders which are used in the cellulose pulp industry (for example, in connection with rotating pocket feeders for high and/or low pressure system in the continuous digestion of wood chips to cellulosic pulp, such as those sold by Kamyr A.B of Karlstad, Sweden, or Kamyr, Inc. of Glens Falls, N.Y.), a pocketed rotating plug is generally conical in shape and fits into a corresponding conical shaped opening in the stationary housing. Such feeders are exposed to pressures in the range of about 1–15 bars, and it is necessary that the clearance between the rotor and the housing be kept at a minimum in order to avoid excessive leakage of cooking liquor, while at the same time being small enough so that metallic contact between the relatively moving rotor and housing does not occur. By practicing the present invention and by utilizing a control system, the rotor plug of such a feeder can be automatically adjusted in the axial direction in order to obtain the desired results, and significant monetary and technical advantages.

The invention is also applicable to other industries, for instance, where there is a need for measuring the clearance in plain bearings, and to other aspects of the pulp industry, as when measuring the gap in various grinding machines, and the like. For instance, in the pulp and paper industry refiners (also known as defibrators) are used to grind raw cellulosic material, such as chips, into pulp, normally utilizing a stationary grinding surface and a rotating grinding surface, which surfaces may be either of conical or flat configuration. The raw material to be ground passes between the opposing surfaces. In such refiners, it is necessary that the gap between the grinding surfaces be kept at a desired distance (which can be as little as a fraction of a millimeter), and it is also necessary that this clearance be accurately measured and adjusted during operation, taking into account any wear of the grinding surfaces. The surfaces are in most cases rough, having grinding portions disposed in a pattern, and of course the spacing between the surfaces must be controlled so that the grinding portions do not touch each other. It is desirable to provide for automatic control of the grinding surfaces so that a desired optimum gap is kept between them.

There have been a number of previous proposals for utilizing magnetic reluctance between a transducer and a closely located ferromagnetic object for distance measurement, such as shown in U.S. Pat. No. 4,387,339. In such devices, when the magnetic field is produced by direct current, the accuracy of the measurement procedure is often disturbed by temperature variations (since they influence the permeability of the ferromagnetic material). When the magnetic field is produced by an alternating current in such prior proposals, the distance determinations can also be disturbed by possible variations of the resistivity of the ferromagnetic material, or the medium located between the transducer and the ferromagnetic object. Other prior art procedures are based on the utilization of a transducer which generates an alternating current magnetic field which induces eddy currents in an electrically conducting object. The eddy current varies with the distance to the transducer. These measurement techniques are also not necessarily precise since they can be disturbed by variations in the resistivity of the object, and the medium between the object and the transducer.

According to the present invention, a method of measuring the distance between a measuring transducer and an opposing surface is provided which eliminates essentially all of the drawbacks associated with previously known techniques like those discussed above. In the practice of the method, the opposing surface is of an electrically conductive and/or ferromagnetic material, and a measuring transducer is utilized. The measuring transducer includes a core surrounded by coils and establishes a magnetic field, with a gap between the measuring transducer and the opposing surface, which gap comprises part of a magnetic circuit between the measuring transducer and the opposing surface. Further, a reference transducer is utilized similar to the measuring transducer, with a constant gap between the reference surface and a surface substantially identical to opposing surface. The method comprises the steps of: (a) supplying alternating current of known amplitude and voltage to the coils of the transducers to produce magnetic fields with each of the transducers; and (b) determining a change in distance between the measuring transducer and the opposing surface by sensing a difference in electromagnetic properties associated with the measuring transducer and/or the reference transducer.

The invention also relates to apparatus for determining the spacing between a measuring instrument and an opposing surface. The apparatus typically comprises the following components: a measuring transducer having a core surrounded by coils and for establishing a magnetic field; means for mounting the measuring transducer with respect to the opposing surface so that there is a gap between them, the gap comprising part of a magnetic circuit between the measuring transducer and the opposing surface; a reference transducer similar to the measuring transducer; a reference body having a reference surface, the reference surface of substantially the same material as the material of the opposing surface; means for mounting the reference transducer with respect to the reference surface so that there is a constant gap therebetween, the gap comprising part of the magnetic circuit of the reference transducer; means for supplying electrical current to the transducer; and means for determining a change in spacing between the measuring transducer and the opposing surface by sensing a difference in electromagnetic properties associated with the measuring transducer and/or the reference transducer.

Apparatus according to the invention is particularly useful for determining the wear of a body in which one or more measuring transducers are located. According to this aspect of the invention there are provided the following components: First and second substantially identical measuring transducers, each comprising a core surrounded by coils connected up to a source of electrical current; said body having an outer surface; an opposing surface of electrically conductive and/or ferromagnetic material, the opposing surface generally parallel to the outer surface with a gap therebetween; and means for mounting the first and second transducers in the body so that they are spaced from each other within the body in a dimension parallel to the outer surface, and so that they are spaced from the outer surface different distances thereby having a different gap distance between each and the opposing surface, so that wear of the body can be detected.

The invention may be readily utilized in a number of different industries, but has particular advantages in the cellulose pulping industry for use with refiners, high pressure feeders, and the like. The invention utilizes standard electronic measuring instruments and electronic parts so that it easy and relatively inexpense to construct, and the invention may be utilized in new equipment, or may be retrofit to existing equipment.

It is a primary object of the present invention to provide a simple yet effective method and apparatus for determining the spacing between opposing surfaces utilizing electromagnetic techniques. This and other objects of the invention will become clear from an inspection of the detailed description of the drawings, and from the appended claims.

DESCRIPTION OF THE DRAWINGS

Figure 1:
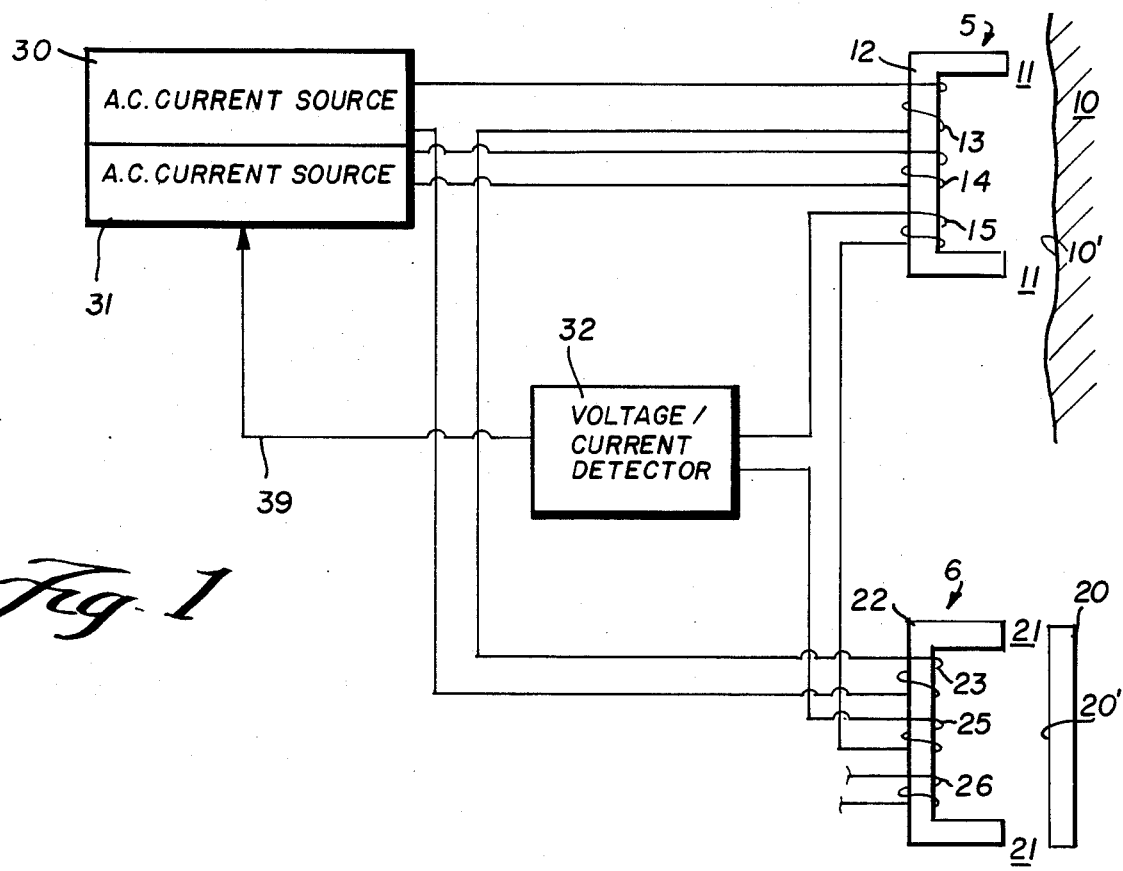
FIG. 1 is a simplified wiring diagram illustrating exemplary apparatus according to the present invention.

In FIG. 1, an exemplary embodiment of the invention is illustrated wherein a single measuring transducer 5 is utilized in association with an object 10 have a surface 10′ hereinafter referred to as an "opposing surface". The invention also utilizes a reference transducer 6, having a reference object or yoke 20, with a reference surface 20′, the yoke 20 being of the same material as the object 10. The material of 10, 20, will be an electrically conductive and/or ferromagnetic material, such as iron, steel, or aluminum. The cores 12, 22, respectively of the transducers 5, 6, have high permeability.

The gap between the measuring transducer core 12 and the opposing surface 10′ of the object 10 is filled with a medium 11, which in the cellulosic industry typically would be a slurry of comminuated cellulosic material, a liquid, or air. A medium 21 is disposed in the gap between the core 22 and the yoke 20, the medium 21 preferably having the same pressure, temperature, and composition characteristics as the medium 11.

A first current generator 30 feeds current to a first coil 13 of the transducer 5, which is connected in series with a first coil 23 of the transducer 6. The current is preferably a constant value alternating current. A second current generator 31 supplies alternating current of the same frequency as the frequency of the current from first generator 30 to a second coil 14 of the transducer 5. The magnetic flux in the core 12 is measured utilizing a third coil 15 which is connected in opposition (that is the turns thereof are opposite, and thus the induced currents therein are opposite) with a coil 25, the coils 15 and 25 being connected to a conventional current/voltage detector 32. A third coil 26, and additional coils, also may be associated with the reference transducer 6 for connection to other measuring transducers comparable to the transducer 5.

The output signal 39 from the detector 32 may be utilized to control the amplitude of the second current generator 31.

The total ampere-turns of the magnetizing coils 13 and 14 of the measuring transducer give a magnetic flux through the core 12, the gap 11, the object 10 and again through the gap 11 into the core 12. This magnetic flux is measured with the coil 15. In the same way the ampere-turns of the magnetizing coil 23 of the reference transducer 6 provide a magnetic flux through the core 22, the gap 21, the yoke 20 and again through the gap 21 and the core 22. This magnetic flux is measured with the coil 25.

Since the coils 15 and 25 are coupled in opposition, the voltage which is fed to the detector 32 will be a measurement of the difference in magnetic flux of the measuring transducer and the reference transducer.

This method can function according to two different principles, which can be applied separately or simultaneously. That is: (a) when the object 10 has a relative permeability which is different from that of the medium 11, the reluctance of the circuit will vary when the distance between the core 12 and the object 10 varies; and/or (b) when the object 10 has a resistivity which is different from that of the medium 11, the eddy current losses will vary when the distance between the core 12 and the object 10 is varied.

Depending upon exactly which components are utilized, and how they are interconnected, utilizing the apparatus of FIG. 1, a number of different variations of the method according to the invention may be provided. These variations are as follows:

(1) Only generator 30 is utilized if the distance between the object 10 and the measuring transducer core 12 is varied, the magnetic flux in the measuring transducer will also vary. If at the same time the distance between the reference transducer core 22 and the yoke 20 is kept constant, the input voltage to the detector 32 will be an indication of the varied distance between the measuring transducer and the object.

(2) Both generators 30 and 31 are utilized by varying the current which the current generator 31 feeds through the coil 14 of the measuring transducer, the input voltage to the detector 32 may be made equal to zero. Then, the current through the coil 14 will be an indication of the spacing between the measuring transducer 5 and the object 10.

(3) By letting the alternating current which the second generator 31 produces have a slowly varying amplitude governed by signal 39, when the distance of the measuring transducer 5 from surface 10 is varying quickly, this current amplitude will be an indication of some average value of the variable distance in the measuring transducer. Different types of average value, e.g. arithmetical average, can then be indicated. The numerical value of the input voltage to the detector 32, combined with the numerical value of the current from the current generator 31, will then indicate a measurement of the instantaneous (at any point in time) value of the variable distance between the measuring transducer and the object.

Variations in temperature and pressure as well as composition of the medium 11 of the measuring transducer can influence the result. This may be counteracted by making the reference transducer 6 and medium 21 as identical to the measuring transducer 5 and medium 11 as possible. It is also advantageous if the magnetic flux in the measuring transducer and the reference transducer is of the same magnitude, i.e. the input voltage to the detector 32 is equal to zero.

Figure 2:
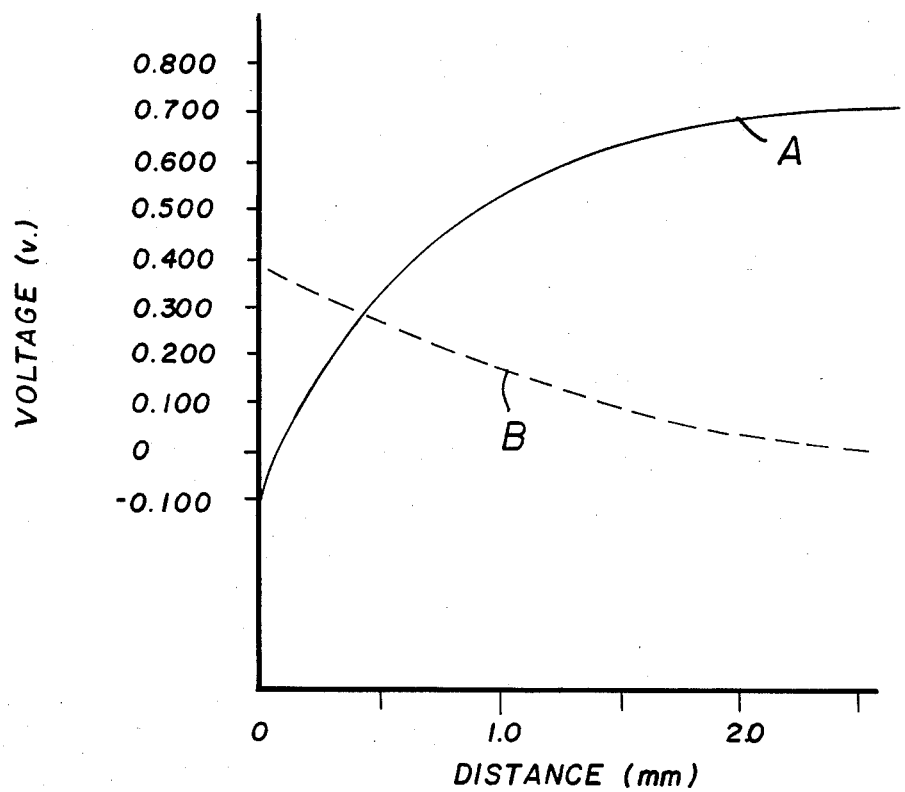
FIG. 2 is a graph plotting distance versus the output voltage of a current detector, which graph results from actual laboratory tests.

FIG. 2 is a graphical representation of actual testing of the apparatus of FIG. 1. In the graph, the x-axis is distance between the measuring transducer 5 and the opposing surface 10' of object 10 in millimeters, while the y-axis shows the output voltage from the detector 32 in volts. Curve A shows the results when the object 10 is ferromagnetic, while Curve B shows results with an object 10 that is aluminum (being electrically conductive but not ferromagnetic). In each case, the frequency of the current supplied by the current generators 30, 31 was about 4 kHz, and the excitation voltage was about 1.1-1.5 volts. Using the graph of FIG. 2 one can calculate the distance between transducer 5 and object 10 when the output voltage of detector 32 is known.

Figure 3:
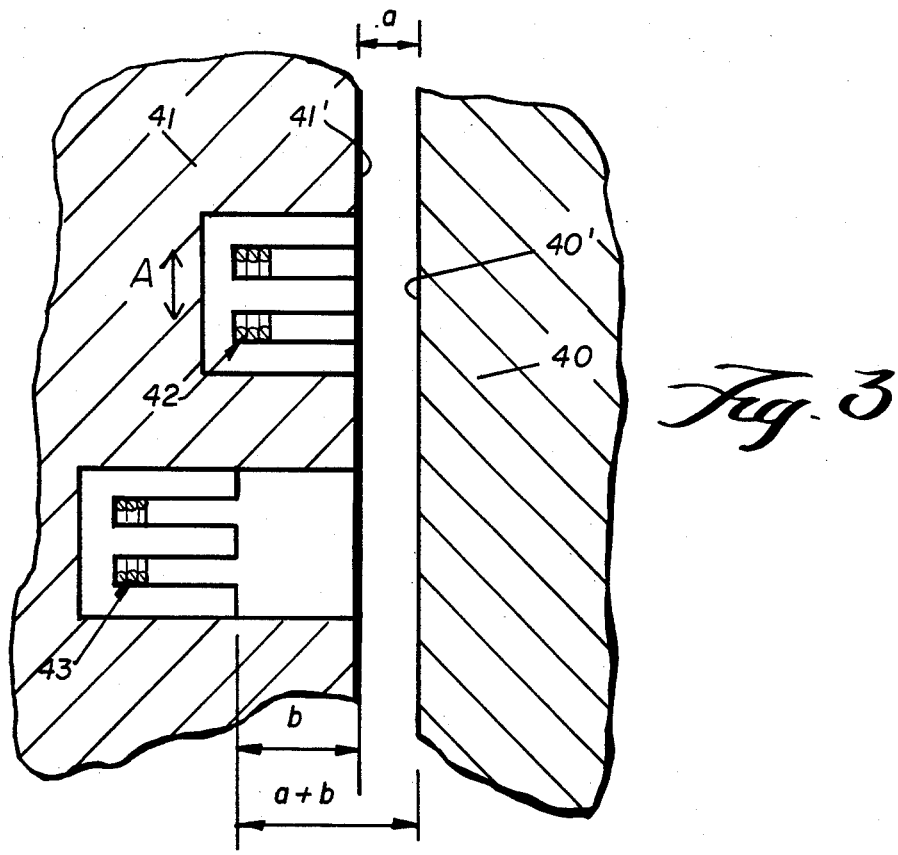
FIG. 3 is a side cross-sectional diagramatic view illustrating an embodiment of the invention wherein a pair of measuring transducers are mounted in one surface which wears with respect to an opposing surface.

FIG. 3 schematically illustrates an embodiment of the apparatus according to the invention for use in measuring the distance between two opposing surfaces which are exposed to wear during relative movement between them. Transducer 12 is replaced by first and second measuring transducers 42 and 43. In this case the body 40 has an "opposing surface" which is spaced distance "a" from an outer surface 41' of a body 41 in which first and second measuring transducers 42, 43, respectively are mounted. The transducers 42, 43 are connected up to a common reference transducer (e.g. transducer 42 would be connected to coil 23 of the reference transducer 6 in FIG. 1, while transducer 43 would be connected up to coil 26). Transducers 42, 43 are spaced from each other in a dimension A which is generally parallel to the surfaces 41', 40'. Also, the transducer 42 is mounted so that it is essentially right at the surface 41' (although recessed in the body 41), while the transducer 43 is mounted so that there is a substantial gap "b" between it and the surface 41'. Utilizing the apparatus of FIG. 3, it is desired to maintain the spacing "a" between the surfaces 40', 41' constant so that they do not come into contact with each other. The transducer 43 measures the distance "a plus b". From the measurement of the spacing a from transducer 42, and the sum "a plus b" from the transducer 43, the spacing "b" can be calculated, and thus the wear of the body 41.

Figure 4:
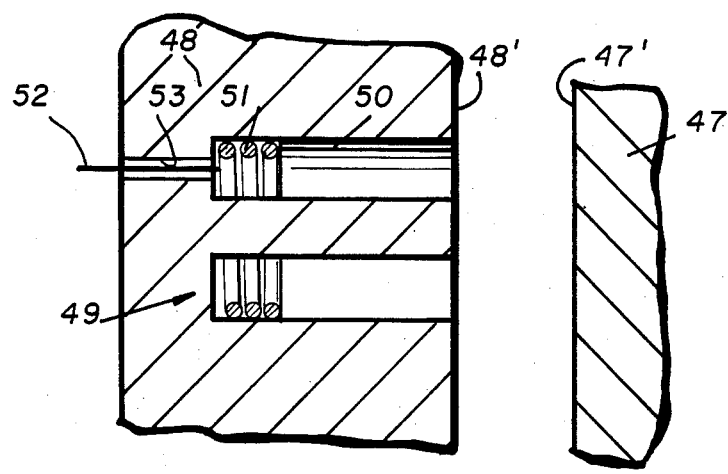
FIG. 4 is a view like that of FIG. 3 only showing one measuring transducer mounted in a surface that will wear with respect to another.

FIG. 4 illustrates another exemplary embodiment in which a body 47 has an "opposing surface" 47', while a ferromagnetic material body 48 has an outer surface 48'. In this case, a measuring transducer 49 having an annular shape, with coil 51, is disposed within a ring-shaped grove 50 which has been milled into the body 48. The contact wires 52 are connected through a hole 53 to a suitable current source. In this embodiment, a strength advantage is provided if the surface 48' is subjected to wear.

In any of the above mentioned fields of application of the invention, where it is possible to adjust the clearance between the surfaces of concern, such as in the case of conical plug feeders and grinding machines (e.g. refiners) the measuring method of the present invention can be used not only to measure and control the clearance and possible wear but also to adjust the clearance so that a desired pressure is maintained in the clearance area. For example in the case of a plug feeder with varying working pressure inside the feeder, the clearance between the rotor and the housing can be controlled to provide a constant pressure of the liquid between the moving and the stationary surfaces by controlling the axial movement of the rotor plug during normal operation to the extent that the inside working pressure is so low that the clearance will be automatically adjusted down to such a small value that there is a risk that there may be metallic contact between the surfaces. From that point on, or preferably before the clearance gets so small, the clearance measurement according to the present invention gives a signal that the conical rotor should not be pressed further into the housing.

In the case of a grinding machine with adjustable distance between the grinding surfaces, the distance can be controlled in a similar manner to provide and maintain a constant pressure in the grinding area down to a preset minimum clearance point. The pressure may be measured in the machine housing upstream of and downstream from the grinding zone and controlled at least partly by the force by which the grinding surfaces are pressed toward each other. Such pressing may be done by hydraulic cylinders and in that case the oil pressure will be an expression of the force applied.

It is readily understood that in closed machinery, especially those working at superatmospheric pressures and elevated temperatures and furthermore having close working surfaces exposed to wear, it is of great importance to have a simple method to measure the actual clearance, with wear taken in account, and to have a safe minimum clearance.

In certain cases it may be advantageous, e.g. for grinding machines in order to optimize the ground material quality to combine the pressure control and the clearance measurements. Thus the control instruments should be preset at a certain pressure range and at a desired clearance in order to obtain the best possible ground material quality.

It will thus be seen that according to the present invention a simple yet effective method and apparatus have been provided for determining the clearance between opposing surfaces utilizing electromagnetic techniques. While the invention has been herein shown and described in what is presently conceived to be the most practical and preferred embodiment thereof, it will be apparent to those of ordinary skill in the art that many modifications may be made thereof within the scope of invention, which scope is to be accorded to broadest interpretation of the appended claims so as to encompass all equivalent methods and apparatus.

We claim:

1. Apparatus for determining the spacing between a measuring instrument and an opposing surface, said opposing surface being one or both of electrically conductive material and ferromagnetic material, said apparatus comprising:
- a measuring transducer having a core surrounded by first and third coils and for establishing a magnetic field;
- means for mounting said measuring transducer with respect to said opposing surface so that there is a gap between them, the gap comprising part of a magnetic circuit between said measuring transducer and said opposing surface;
- a reference transducer similar to said measuring transducer, and comprising first and second coils and a current detector;
- a reference body having a reference surface, said reference surface of substantially the same material as the material of said opposing surface;
- means for mounting said reference transducer with respect to said reference surface so that there is a constant gap therebetween, said gap comprising part of the magnetic circuit of said reference transducer;
- means for supplying electrical current to said transducers, comprising a first current source;
- a second source of electrical current; and
- means for determining a change in spacing between said measuring transducer and said opposing surface by sensing a difference in electromagnetic properties associated with said measuring transducer and said reference transducer;
- said first coils connected together in series with said first current source, and said second coil of said reference transducer connected in opposition to said third coil of said measuring transducer, and to said current detector; and said measuring transducer comprising a second coil connected to said second source of electrical current.

2. Apparatus as recited in claim 1 wherein said current detector is operatively connected to said second source of electrical current to control said second source in response to current detected by said current detector.

3. Apparatus as recited in claim 2 wherein said measuring transducer comprises first and second transducers disposed in a body of material having an outer surface which is generally parallel to said opposing surface, said first measuring transducer spaced from said outer surface a different distance than said second measuring transducer, wherein wear of said body can be detected.

4. Apparatus as recited in claim 2 wherein said measuring transducer is generally annular in shape, and further comprising a body of ferromagnetic material having an outer surface which is generally parallel to said opposing surface, and a ring-shaped recess in said body, said measuring transducer disposed in said ring-shaped recess so that it is spaced from said outer surface so that wear of said body can be detected.

5. Apparatus is recited as claim 1 wherein a slurry of comminuted cellulosic material fills the gaps between the measuring transducer and opposing surface, and reference transducer and reference surface.

6. Apparatus for determining wear of a body, comprising:
- a reference transducer;
- first and second substantially identical measuring transducers, each comprising a core surrounded by coils connected up to a source of electrical current;
- means operatively connecting said first and second transducers and said reference transducer;
- said body having an outer surface;
- an opposing surface one or both of electrically conductive and ferromagnetic material, said opposing surface generally parallel to said outer surface with a gap therebetween;
- means for mounting said first and second transducers in said body so that they are spaced from each other within said body in a dimension parallel to said outer surface, and so that they are spaced from said outer surface different distances thereby having a different gap distance between each and said opposing surface; and
- means connected to said first and second transducers and including said reference transducer for determining a change in distance between the measuring transducer and said outer surface so that wear of said body can be detected.

7. Apparatus is recited in claim 6 further comprising a slurry of comminuted cellulosic material disposed in said gap between said opposing surface and said outer surface, and between said measuring transducer and said opposing surface.

8. Apparatus for determining the spacing between a measuring instrument and an opposing surface, said opposing surface being one or both of electrically conductive material and ferromagnetic material, said apparatus comprising:
- a first measuring transducer having a core surrounded by first and third coils and for establishing a magnetic field;
- means for mounting said measuring transducer with respect to said opposing surface so that there is a gap between them, the gap comprising part of a magnetic circuit between said measuring transducer and said opposing surface;
- a reference transducer similar to said measuring transducer, and comprising first and second coils and a current detector;
- a reference boy having a reference surface, said reference surface of substantially the same material as the material of said opposing surface;
- means for mounting said reference transducer with respect to said reference surface so that there is a constant gap therebetween, said gap comprising part of the magnetic circuit of said reference transducer;
- means for supplying electrical current to said transducers, comprising a first current source; and
- means connected with said measuring transducer and said reference transducer for determining a change in spacing between said measuring transducer and said opposing surface by sensing a difference in electromagnetic properties associated with said measuring transducer and said reference transducer;
- said first coils connected together in series with said first current source, and said second coil of said reference transducer connected in opposition to said third coil of said measuring transducer, and to said current detector; a second measuring transducer substantially identical to said first measuring transducer; and a third coil of said reference transducer, said third coil of said reference transducer operatively connected to said second measuring transducer and a source of electrical current.

9. Apparatus as recited in claim 8 wherein a slurry of comminuted cellulosic material fills the gaps between the measuring transducer and opposing surface, and reference transducer and reference surface.

10. A method of measuring the distance between a measuring transducer and an opposing surface, the opposing surface being one or both of electrically conductive material and ferromagnetic material, and utilizing as the measuring transducer a core surrounding by first and third coils and for establishing a magnetic field, with a gap between the measuring transducer and the opposing surface, which gap comprises part of a magnetic circuit between the measuring transducer and the opposing surface, and further utilizing a reference transducer similar to the measuring transducer, with a constant gap between the reference transducer and a reference surface substantially identical to the opposing surface, the reference transducer having first and second coils, and there being first and second current generators, said method comprising the steps of:
(a) supplying alternating current of known amplitude and voltage to the first coils of the transducers with the first current generator and supplying a current with an amplitude varying slowly compared with the variation of the gap between the measuring transducer and the opposite surface with the second current generator to the second coil of the measuring transducer; and
(b) determining a change in distance between the measuring transducer and the opposing surface by sensing a difference in electromagnetic properties associated with the measuring transducer and the reference transducer.

11. A method as recited in claim 10 wherein steps (a) and (b) are practiced by maintaining the ampere-turns of the coils of the two transducers constant, and determining the differences between the magnetic fields produced by the coils, whereby the distance of the measuring transducer from the opposing surface can be calculated.

12. A method as recited in claim 11 wherein the difference between the magnetic fields is determined by measuring the induced voltages in coils of the transducers.

13. A method as recited in claim 10 further utilizing a first current generator for supplying current to series connected first coils in the measuring and reference transducers, and a current detector to which a second coil in the reference transducer and a third coil in the measuring transducer are operatively connected in op-position; and wherein steps (a) and (b) are practiced by supplying current of common amplitude and voltage to first coils of each of the two transducers with the first current generator, and determining the input voltage to the current detector, which is related to a variation in distance between the measuring transducer and the opposing surface.

14. A method as recited in claim 10 wherein the measuring transducer is a first measuring transducer, and further utilizing a second measuring transducer, the reference transducer common to both measuring transducers, and both measuring transducers recessed differing amounts in a body having an outer surface which is generally parallel to said opposing surface, and comprising the further steps of practicing steps (a) and (b) for both measuring transducers so that the amount of wear of the outer surface with respect to the opposing surface may be determined.

15. A method as recited in claim 10 wherein the measuring transducer is generally annular in shape, and comprising the further step of mounting the measuring transducer in a ring-shaped groove in a body of ferromagnetic material, the body having an outer surface that is generally parallel to the opposing surface, so that the measuring transducer measures the wear of the body outer surface.

16. A method as recited as claim 10 wherein the gap between the measuring transducer and the opposing surface, and between the reference transducer and its associated surface, are each filled with a slurry of comminuted cellulosic material.

17. A method of measuring the distance between a measuring transducer and an opposing surface, the opposing surface being one or both of electrically conductive material and ferromagnetic material, and utilizing as the measuring transducer a core surrounded by coils and for establishing a magnetic field, with a gap between the measuring transducer and the opposing surface, which gap comprises part of a magnetic circuit between the measuring transducer and the opposing surface, and further utilizing a reference transducer similar to the measuring transducer, with a constant gap between the reference transducer and a reference surface substantially identical to the opposing surface, further utilizing a first current generator for supplying current to series connected first coils in the measuring and reference transducers, a second current generator for supplying current to a second coil in the measuring transducer, and a current detector to which a second coil in the reference transducer and third coil in the measuring transducer are operatively connected in op-position; said method comprising the steps of:
(a) supplying alternating current of known amplitude and voltage to the coils of the transducers to produce magnetic fields with each of the transducers; and
(b) determining a change in distance between the measuring transducer and the opposing surface by sensing a difference in electromagnetic properties associated with the measuring transducer and the reference transducer;
said steps (a) and (b) being practiced by supplying with the second current generator to the second coil of the measuring transducer a current with an amplitude varying slowly compared with the variation of the gap between the measuring transducer and the opposite surface, and determining the instantaneous value of the distance from the measuring transducer and the opposing surface at a particular point in time by utilizing the numerical value of the current from the second current generator to the second coil of the measuring transducer and the numerical value of the input voltage to the current detector at that particular point in time.

* * * * *